United States Patent [19]

Frame et al.

[11] 3,916,499
[45] Nov. 4, 1975

[54] HYDRAULIC BEARING MOUNTING PRESS

[75] Inventors: Charles W. Frame; Jack A. Rickrode, both of Chambersburg, Pa.

[73] Assignee: Chambersburg Engineering Company, Chambersburg, Pa.

[22] Filed: Jan. 9, 1975

[21] Appl. No.: 539,819

[52] U.S. Cl.................. 29/208 C; 29/252; 100/48
[51] Int. Cl.² .......................................... B23P 19/02
[58] Field of Search................ 29/208 C, 251, 252; 100/48

[56] References Cited
UNITED STATES PATENTS

| | | | |
|---|---|---|---|
| 2,906,012 | 9/1959 | Rothfuchs | 29/252 |
| 2,934,819 | 5/1960 | Sorensen | 29/252 |
| 3,713,198 | 1/1973 | Tobak | 29/252 X |
| 3,848,525 | 11/1974 | Kent | 100/48 |

*Primary Examiner*—Al Lawrence Smith
*Assistant Examiner*—Gary L. Smith
*Attorney, Agent, or Firm*—Dorfman, Herrell and Skillman

[57] ABSTRACT

Two opposing hydraulic rams simultaneously drive bearings onto bearing seats at opposite ends of an axle assembly on which wheels inside the bearing seats are already in place. Wheel support dollies initially position and support the wheel and axle assembly between the opposing rams. The rams are adjusted vertically to opposed positions concentric with the axle. As the rams act upon the bearings, the axle and its supporting dollies can move axially off its center position if greater resistance is encountered in mounting one bearing than in mounting the other. Sensing means mounted on the wheel support dollies monitor the movement of the axle and stop the flow of driving fluid to the ram which has pushed the axle off center until the opposite ram recenters the axle.

23 Claims, 11 Drawing Figures

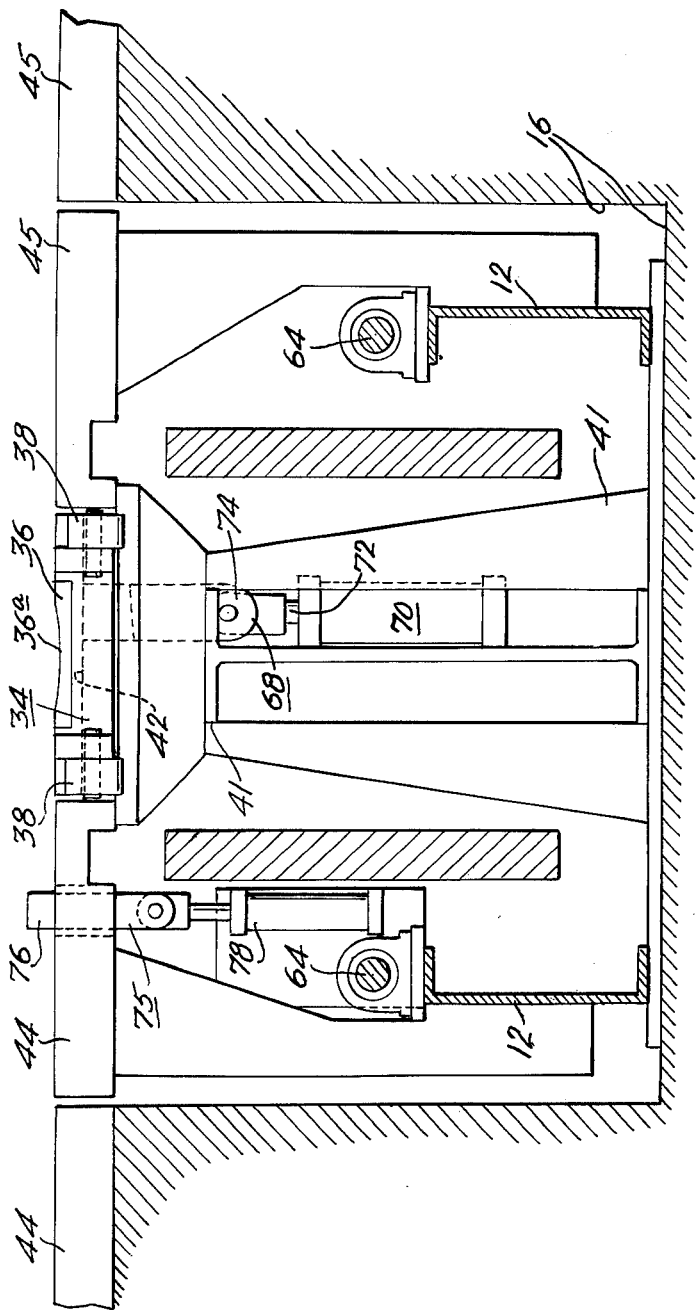
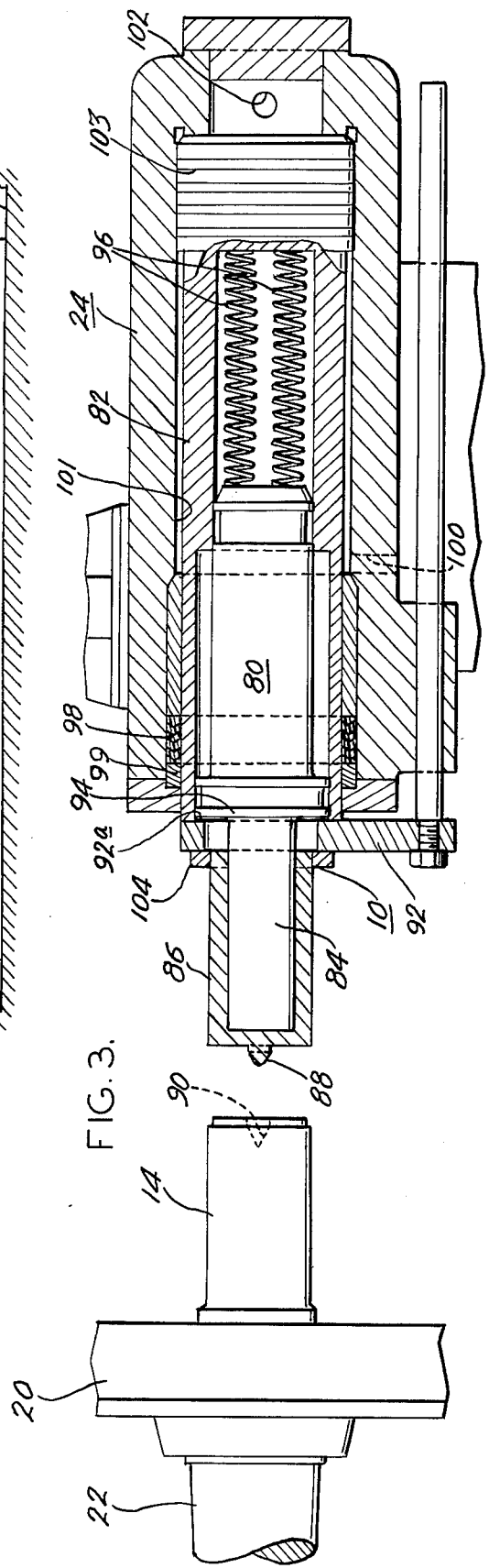
FIG. 4.
FIG. 3.

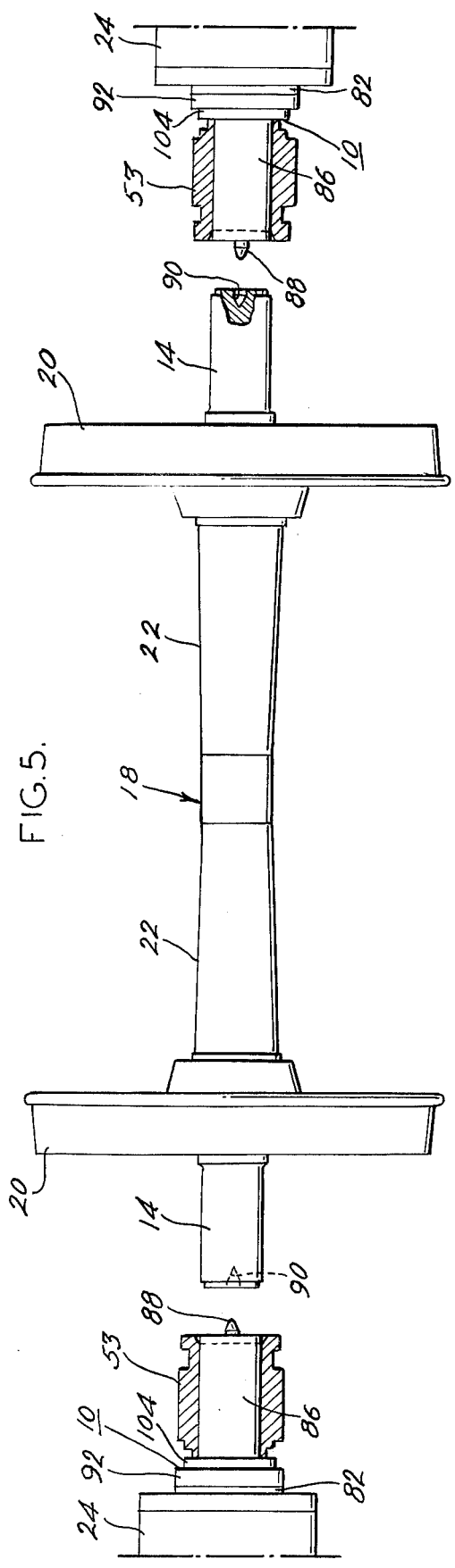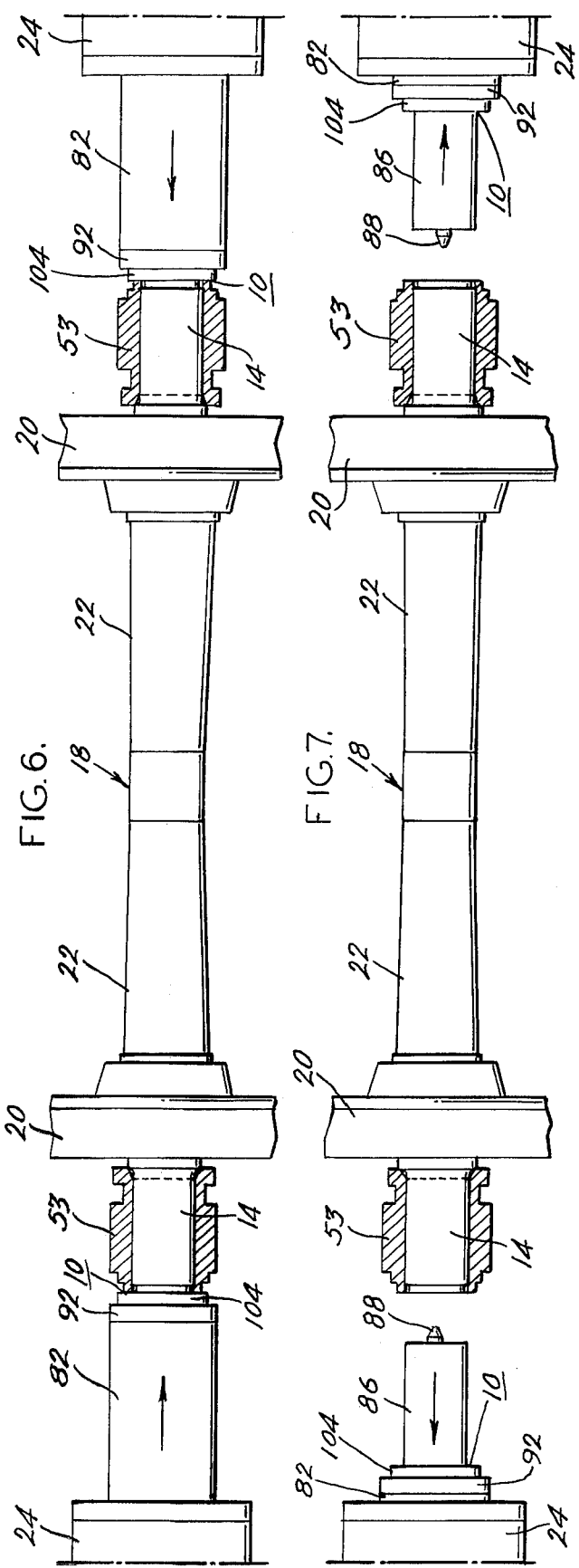

HYDRAULIC BEARING MOUNTING PRESS

BACKGROUND

The present invention relates to a press for simultaneously mounting bearings on opposite ends of a railroad axle, including means to monitor axle position and regulate ram action in response thereto. More specifically it relates to a bearing press in which the axle is supported only by the opposing rams which drive the bearings in place during the mounting operation and to sensing means which monitor the displacement of the axle from its normal center position and cause the rams to recenter the axle.

Presses of the prior art for mounting bearings on the bearing seats of an axle simultaneously typically employ opposing hydraulic rams with the axle rigidly supported between them and no sensing means are needed to monitor displacement of the axle from its center position. As the bearings are pressed on, no movement of the axle is allowed. Rigid support of an axle is illustrated in the patent to O. E. Rothfuchs et al. 2,906,012. Other presses uses for mounting and demounting press fitted wheels from axles also use opposing hydraulic rams. Normally, in such presses, the wheels are not mounted or demounted simultaneously. Instead, each wheel is handled separately in a sequence of steps which may involve movement of the wheel or the axle axially from one station to another. Such movements are regulated by limit switches which sense the position of the wheel and axle at a series of critical points as each sequential step takes place indicating that a part is in a predetermined position so that the next sequential step may take place. The patents to J. W. Reed et al. 3,050,837 and Hoffman 3,189,985 illustrate such systems.

SUMMARY OF INVENTION

The bearing press of the present invention is so designed that bearings are pressed onto the axle simultaneously rather than sequentially. This bearing press permits an axle to which bearings are being applied to move axially along its axis and in this respect is also a departure from the prior art. In order to control and limit axle movement, sensing means monitor this movement and cause adjustment of forces applied to the rams to recenter the axle.

The construction described has the advantage of time and steps saved in the procedure of mounting the bearings. The arrangement also leads to an efficient overall assembly system in which wheel sets and axles merely roll from loading rails onto wheel support dollies in position to be engaged by the rams and roll off again after the bearings are in place. The machinery is compact since little axial movement of the axle wheel set occurs in mounting the bearings so that ram length may be kept relatively short and relatively inexpensive.

More specifically the present invention relates to a hydraulic press for simultaneously mounting bearings on axle bearing seats located at opposite ends of an axle. The press comprises a supporting frame with opposing cylinders mounted on the frame. Each hydraulic ram in its respective cylinder is movable toward the other to engage and position an axle between them, in a predetermined position. Each ram has means for supporting a bearing concentric with the seat of said axle. Further means is provided which is relatively movable with respect to each ram for driving the respective bearings from supporting means onto its adjacent axle bearing seat. Fluid supply means is provided to supply fluid to each of said cylinders to drive the rams toward one another. Means is provided for sensing axial displacement of the axle from its center position as a result of one bearing requiring more force to be driven onto place than the other. Another means is provided responsive to said sensing means for causing unequal pressure to be applied to the cylinders to continue to drive the axle bearing onto the axle bearing seats and to recenter the axle.

BRIEF DESCRIPTION OF FIGURES

For a better understanding of the present invention, reference is made to the accompanying drawings in which:

FIG. 3 is a fragmentary sectional view of the cylinder assembly;

FIG. 4 is a sectional view taken along line 4—4 of FIG. 1;

FIG. 5 is a fragmentary front elevation and view similar to FIG. 1 showing the opposing rams retracted but each supporting and axle bearing and with an axle positioned between them;

FIG. 6 is a view similar to FIG. 5 showing the centering means of the opposing rams in contact with the axle and with the rams themselves extended to the position where the bearings have been driven onto the axle bearing seats;

FIG. 7 is a view similar to FIG. 1 with the opposing rams retracted and the axle bearings seated on the axle bearing seats.

DESCRIPTION OF THE SPECIFIC EMBODIMENT

Figure 1:
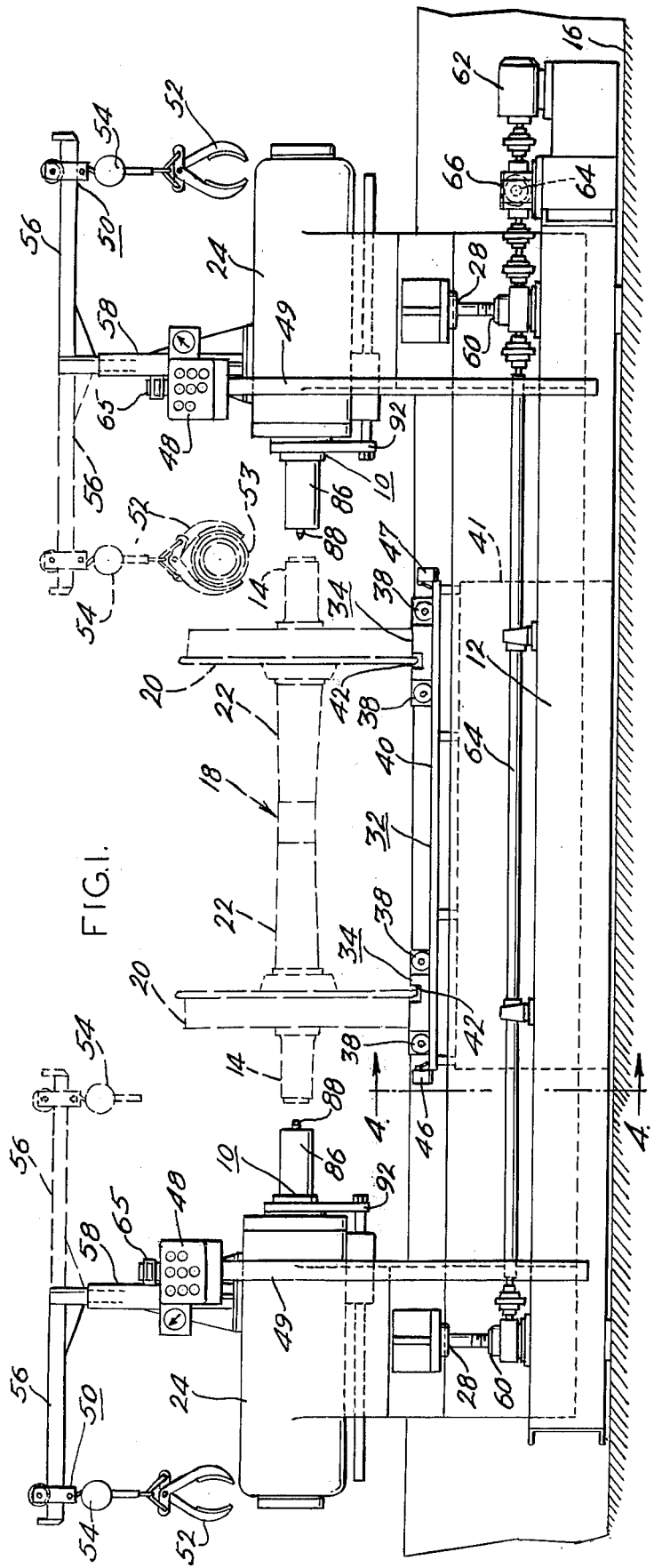
FIG. 1 is a front elevation view of the axle bearing mounting press with an axle positioned between opposing rams.
Figure 2:
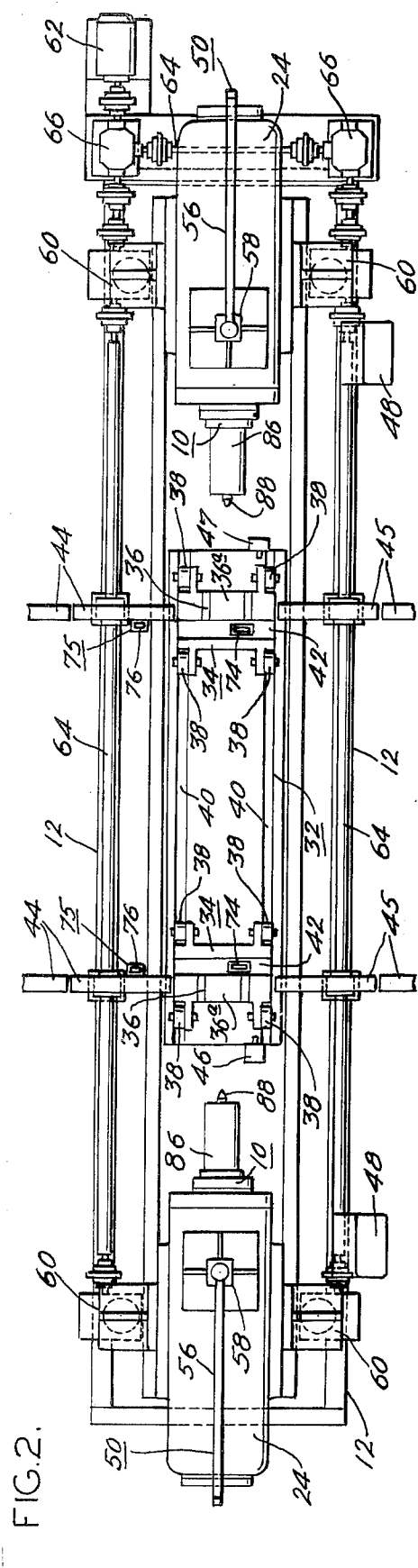
FIG. 2 is a plan view from above of the axle bearing mounting press.

FIGS. 1 and 2 show a hydraulic press using two opposing rams supported on a press bed or frame 12 for simultaneously mounting bearing on bearing seats 14 at opposite ends of axle 18. The hydraulic rams are contained in similar opposed hydraulic cylinders 24, each of which is supported on the frame 12 by an elevator structure generally designated 28. The base 12 of the press and much of its structure is located in a trench 16 which may be formed on concrete and which has a depth permitting handling of the wheel sets 22 by rolling on tracks at ground level. The wheels of wheel set 22 are carried on a wheel dolly support unit, generally designated 32, which has two similar but oppositely oriented wheel dollies 34. The wheel dollies each have four rollers 38 which roll on a pair of tracks 40, carried on a track pedestal 41 extending upwardly within trench 16. The tracks 40 are parallel to the axial extension of axle 18 and enable axial movement of the axle in the press. Each dolly 34 is flush with the ground and has a wheel flange groove alignable with the inside edge of loading tract 45 and unloading track 44. The dollies are arranged to center the axle between the opposing rams 10. The rollers 38 and track 40 enable the wheel set to be moved along its axis on the dollies from the center position illustrated in FIG. 1. Sensing means in the form of micro-switches 46 and 47 are positioned to be engaged by the dollies. To monitor dolly position in the sense of detecting excess axial travel of the wheel set 22 on its support dollies 34, the micro-switches control fluid feed to the hydraulic cylinders in such a way as to cause the rams 10 to recenter the axle.

Identical process control panels 48 are mounted at both ends of the press. The controls are supported on support columns 49 which provide conduits through which electrical leads are fed and from the base (not shown) of which they are distributed. The process control panels are used to control the operation of the press.

Identical jib cranes 50 are mounted atop each hydraulic cylinder 24, respectively, and are used as shown in phantom in FIG. 1 for positioning the bearing 53 to be mounted on the axle by the press. Each jib crane consists of claw means 52 for engaging and holding a bearing 53, actuator means 54 including motor means for operating the claw, a beam 56 along which a claw and actuator assembly are preferably movable, and pivot support means 58 enabling positioning of the boom 56. Positioning, engaging and release of the bearing is controlled at control panel 48.

Each elevator 28 is anchored below floor level to the base of support frame 12 and consists of two lift units, or four units form the system, one at each corner. The lifts are screw jacks 60 powered and driven in unison by a hydraulic motor 62 and coupled by conventional mechanical shafts 64 and right angle drive units 66. The lift units 60, in turn, support the hydraulic cylinder 24. The lift units 60 and their drive motor 62 are controllable by a four position elevator control joy stick on the process control panel 48 which enables the operator to continuously move or jog the lift units 60 and hydraulic cylinders 24 up or down in unison. The wheel set 22 will be positioned on wheel dolly support unit 32 at a specific vertical height depending on the size of the wheels 20, therefore the hydraulic cylinders 24 must be capable of being raised or lowered so as to be vertically in line with the axis of the axle. To aid the operator in positioning the hydraulic cylinders 24 a wheel tape read out counter 65 is provided at each station which consists of a counter mechanically connected to the press elevator mechanism calibrated to indicate the proper vertical position of the press with respect to the size of the wheel.

Details of the construction of hydraulic cylinder 24 and ram 10 are seen in FIG. 3. As can be seen ram 10 is a two piece structure the pieces 80 and 82 of which telescope and are axially slidable relating to one another. Inside ram piece 80 has a mandrel extension 84 which carries a replaceable bearing sleeve or cup 86 which snugly fits on the mandrel 84 and provides a centering cone 88 provided to enter a mating lathe center 90 at the ends of the axle on the axis for quick centering and axial alignment purposes. The outer ram piece 82 has a ram face 92 providing an inwardly extending shoulder extension 92a, opposing an outwardly extending shoulder extension 94 on inner ram member 80. Compression springs 96 between axially spaced transverse portions of the ram pieces 80 and 82 tend to drive these members axially apart until shoulders 92a and 94 stop such movement.

Packing 98 and packing ring 99 act as a pressure retainer for the hydraulic return chamber 101 formed between the outer piece 82 of the ram and the cylinder. A port 100 allows introduction of hydraulic fluid into this chamber. Piston rings 103 act as the pressure retainer for the end of the hydraulic return chamber opposite the packing. In addition the piston rings maintain hydraulic pressure for the hydraulic cylinder 24 which has hydraulic fluid introduced through port 102.

When the bearing is placed over sleeve 86 and the inner member 80 is bearing against the end of axle 18 additional fluid pressure on the end of outer piece 82 will cause the springs 96 to compress as the outer piece is driven forward and abutment rings 104 urges the bearing off the sleeve 86 and onto the bearing seat 14.

As shown in FIG. 4 each dolly 34 has removable adjustable and renewable locating plates 36 providing a recess 36a the shape of the wheel in which the wheel 20 is centered. The wheel support dolly number unit 34 also has a wheel set discharge mechanism 68 which consists of a hydraulic cylinder 70 anchored to pedestal 41 whose output plunger 72 is connected to a vertically oriented ram 74 guided through a portion of pedestal 41 off center in order to push the wheel toward unloading rails 44. The discharge mechanism is controlled by the wheel set discharge control on the process control panel 48. If a wheel set 22 enters the dollies 34 with excessive speed a safety latch 75 prevents it from rolling through the press. Latch 75 consists of a vertically oriented barrier plunger 76 urged by hydraulic cylinder 78 into the path of wheel sets being loaded from tract 45. When the wheel set discharge unit 68 is activated, the safety latch 75 is retracted to allow the wheel to enter the unloading rails 44.

FIGS. 5, 6 and 7 illustrate steps in mounting the bearings on the bearing seats 14. The bearings are first put in place on the bearing sleeve 86 of ram 10 using the jib cranes. Opposing rams are then extended by use of the ram control joy stick. Both rams are advanced toward the axle at advance speed and the centering cone 88 of the ram sleeve 86 enters the lathe center 90 in the end of the axle to line up the ram extension and axle concentrically. As the rams continue to be extended and the abutment rings 104 which are driven by the outer members 82 of ram 10 slide the bearings from the sleeves 86 and press them onto the axle bearing seats 14, the bearings meet resistance as they are driven onto their seats and the advance of the rams automatically slows down to pressing speed. The abutment ring 104 is preferably releasably attached to ram face 92 to be withdrawn from the work axle with the outer member 82. As the outer portion 82 advances, the inner portion 80 cannot advance so that the mandrel 84 and sleeve 86 are effectively retracted into the outer member 82.

Different amounts of force may be required to press each bearing onto the axle; therefore the greater resistance of one bearing will cause the movable axle to be displaced axially from its center position. The dollies 34 supporting the wheel set 22 will move axially with the axle and one of the sensing micro-switches 46, 47 depending on the direction of motion, will be activated will deenergize and stop the advance of the leading ram which has pushed the axle off center. The circuit of this micro-switch acts upon conventional circuitry to close the valve controlling fluid flow into the cylinder housing of the leading ram on the side of the press opposite the actuated switch. This provides opportunity for the other ram to recenter the axle. The carriage centered light on each of the process control panels 48 is illuminated whenever the wheel set is centered, and neither switch 46, nor 47, is contacted.

After the bearing has been pressed on as seen in FIG. 6, the rams are retracted by directing the ram control joy stick toward retract. If one ram retracts faster than the other, the axle will be pushed off center and one of the sensing micro-switches will be actuated causing the ram pushing the axle off center to be stopped until the opposing ram recenters the axle.

Finally, when the rams are fully retracted as seen in FIG. 7, the ejectment mechanism is energized and rolls the wheel set off the press onto rails 44.

The following controls which have been previously described are on the process control panel: the ram control, the press elevator control and the wheel set discharge control. In addition, there is a station active control selector switch which allows the operator to switch control stations to either side of the press but still only have one station active for safety purposes. An emergency stop is also provided, which when depressed deenergizes the entire process. There are also indicator lights for hydraulic power on, wheel set centering, and the right and left hand station control active.

Figure 8:
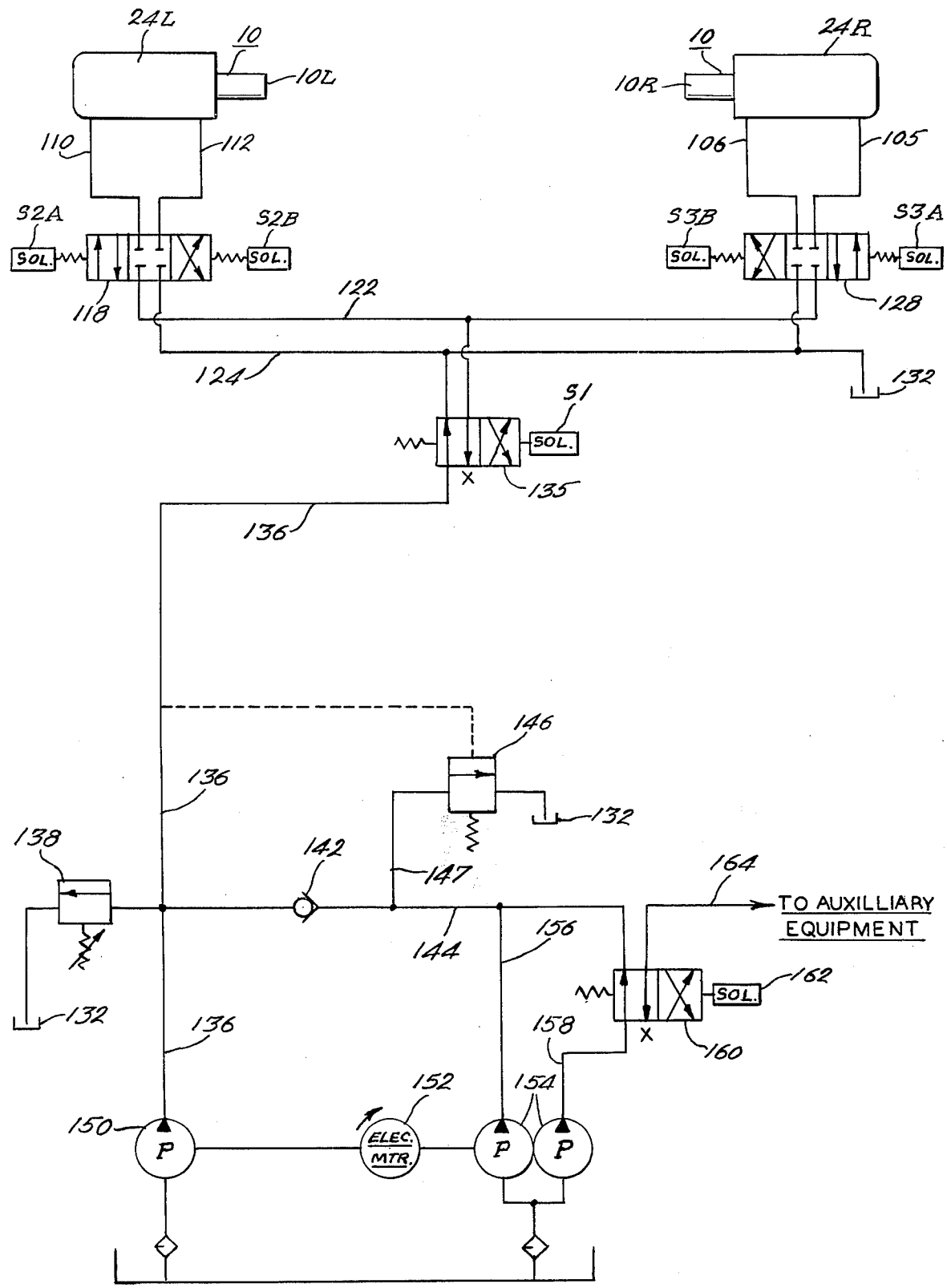
FIG. 8 is a schematic diagram of the hydraulic system providing power to the press.

FIG. 8 is a schematic representation of the hydraulic system. Electric motor 152 drives the high pressure piston pump 150 which provides a high operating fluid pressure to the rams 10 and also drives the low pressure axial vane pump 154 which provides a low operating fluid pressure, respectively, to the elevator assembly 28, the wheel set discharge mechanism 68, the safety latch 75 and any auxiliary equipment.

The high pressure piston pump 150 is connected to the rams 10 via a hydraulic line 136, valve 135, hydraulic line 122, valves 118 and 128, and hydraulic lines 110, 112, 106 and 105. A high operating fluid pressure is provided from high pressure piston pump 150 to line 136 which then communicates it to valve 135. Valve 135 is an on-off valve activated by solenoid S1, which when energized, positions the valve to the on position. In the on position, valve 135 permits high operating fluid pressure from hydraulic line 136 to enter hydraulic line 122 common to both valves 118 and 128. High pressure is alternatively provided to communicate with the rams 10 through hydraulic lines 110 or 112, 105 or 106 to extend them toward one another, retract, or stop them. The connection that valve 135 has with return line 124 is plugged so that line 124 communicates between valves 118 and 128, and the sump 132. The plug prevents operating hydraulic fluid returning from valves 118 and 128 through lines 124 from flowing back into valve 135 and insures that it returns to sump 132.

When valve 135 is deactivated by the deenergization of solenoid S1 the valve is positioned to the off position and the connection of hydrualic lines 122 and 124 with respect to the hydraulic line 136 coming into the valve are reversed. The high operating fluid pressure, from hydraulic line 136, passes through the valves and into the hydraulic return line 124 and sump 132 to be recirculated. One of the outlets of valve 135 is plugged to prevent hydraulic fluid from flowing out of hydraulic line 122 through the valve.

Each valve 118 and 128 has three operating states, two of which they distribute the high operating fluid pressure from hydraulic line 122 when valve 135 is activated. When solenoid S2A is energized, operating fluid pressure is provided through line 110 to the rear of cylinder 24L to drive the ram 10L toward ram 10R. In that valve position, line 112 drains the opposite side of cylinder 24L to sump 132 through line 124. If solenoid S2B is energized, operating fluid pressure is provided to the front of the cylinder through line 112 to retract the ram 10L away from ram 10R. If neither S2A and S2B is energized, no operating fluid pressure is fed to the cylinder. Valve 128 has a pair of solenoids S3A and S3B which actuate cylinder 24R in the same manner through lines 105 and 106. The solenoids S1, S2A, S2B, S3A and S3B are all actuated by electrical relays and switches whose operation will be explained later when the electrical system is examined in detail.

If the ram control joy stick on panel 48 (FIG. 1) is in the extend position, the solenoid S2A of valve 118 and solenoid S3A of valve 128 are energized together with solenoid S1 of valve 135. This causes the rams to move toward the opposing rams.

If during the bearing mounting operation, one bearing offers more resistance than the other, the wheel set 22, and consequently support dolly 34, will be driven off center toward the ram meeting the least resistance. This will actuate the appropriate one of the center limit switches 46 or 47. If the bearing on the right offers more resistance than the bearing on the left, ram 10R will drive the wheel set 22 toward the left and actuate left limit switch 46. This will activate a relay 6CR shown in FIG. 9a whose operation will be explained later and deenergize solenoid S3A of valve 128 to cause operating fluid flow from hydraulic line 122 to be cut off to the hydraulic line 105 and cylinder 24R, thus stopping the right ram 10R from advancing toward the opposing ram 10L. The left ram 10L will continue to advance singly until the wheel set is again centered. If instead the left ram offers more resistance, the same sequence will occur with solenoid S2A being deenergized by the right limit switch 47 and relay 5CR shown in FIG. 9a. In this fashion the operation continues until both bearings are seated. It is significant that without the centering arrangement, it would be possible for one ram to extend twice its normal stroke before the bearing are seated.

After both bearings are seated, the ram control joy stick on control panel 48 is directed to the RETRACT position to actuate solenoid S2B of valve 118 and solenoid S3B of valve 128. This causes the hydraulic connections of valve 118 and 128 to be reversed to retract their respective rams.

If one ram retracts at a faster rate than the other, the spring loaded inner members 80 will displace the wheel set towards the ram retracting fastest. If, for example, the wheel set is driven toward the left, the left limit switch 46 is actuated. This will actuate a relay 6CR shown in FIG. 9a which will deenergize solenoid S2B and cause valve 118, to cut off operating fluid pressure to the hydraulic line 112, thus stopping the ram 10L. The right ram 10R will continue to retract until the wheel set is again centered. Similarly, should the wheel set be driven right, the right limit switch 47 is actuated and in a manner similar to that described, the right ram 10R stops. The retraction of the rams continues with one or both moving, depending upon the centered condition of the wheel set, until both rams are fully retracted.

Motor 152 drives the low pressure, vane type, double pump 154. Normally the flow from both outlets of pump 154 communicate with valve 135 to extend or retract the rams 10L and 10R. When solenoid 162 of valve 160 is energized the flow from one outlet, through line 158, is diverted to line 164, which serves to supply the auxiliary equipment, such as the elevator, wheel set discharge, and safety latch.

Unloading-valve 146, normally is closed. However, when the pressure in line 136 exceeds a preset limit, unloading valve 146 opens and diverts the flow from pump 154 directly to the sump 132. Check valve 142 isolates the low pressure system from the high pressure developed in pump 136.

High pressure relief valve 138 is normally closed. However, when system pressure exceeds the preset limit, relief valve 138 opens to divert flow to sump 132.

Figure 9A:
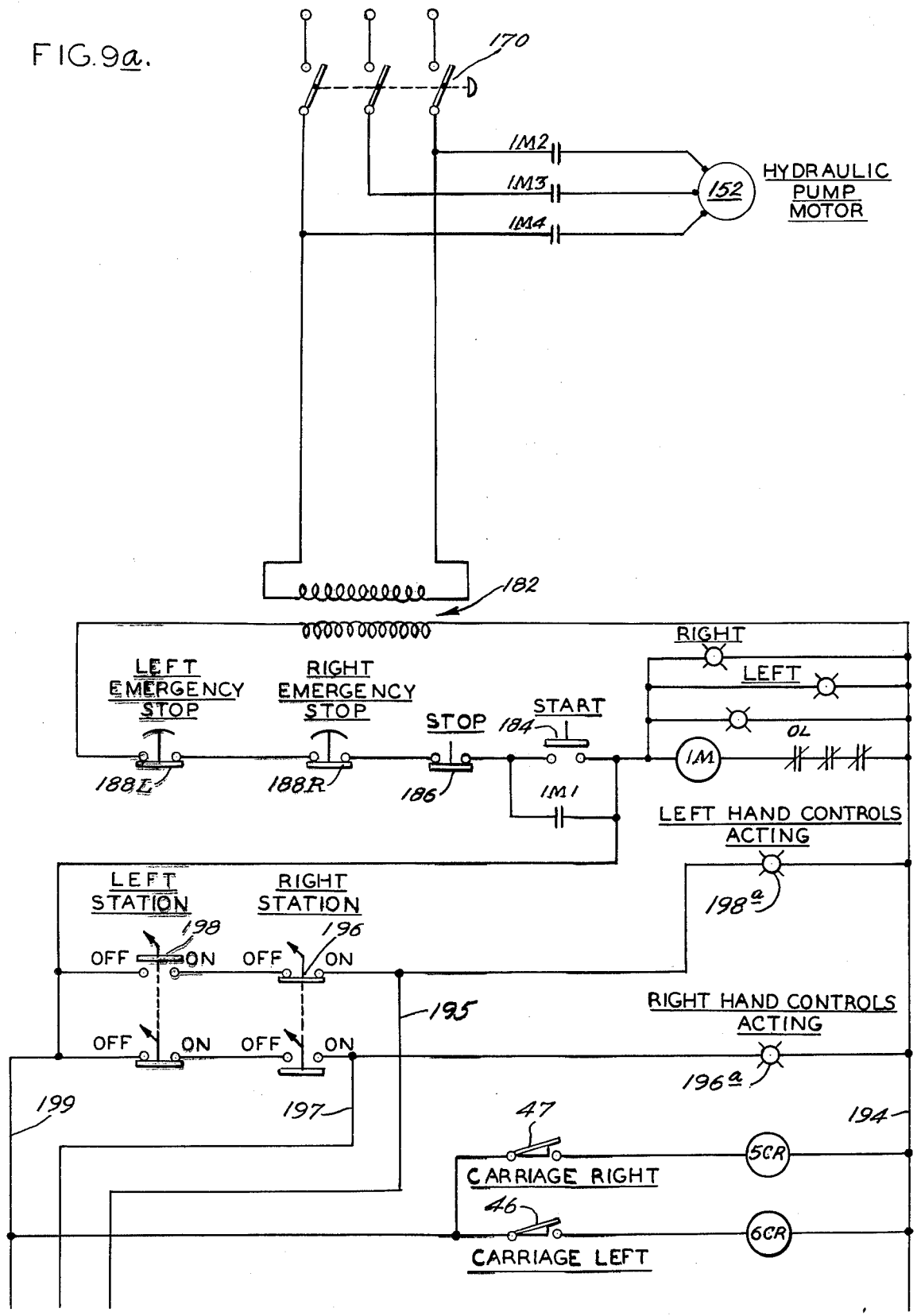
FIGS. 9a, 9b and 9c are schematic diagrams of the electrical circuits controlling the operation of the press.
Figure 9B:
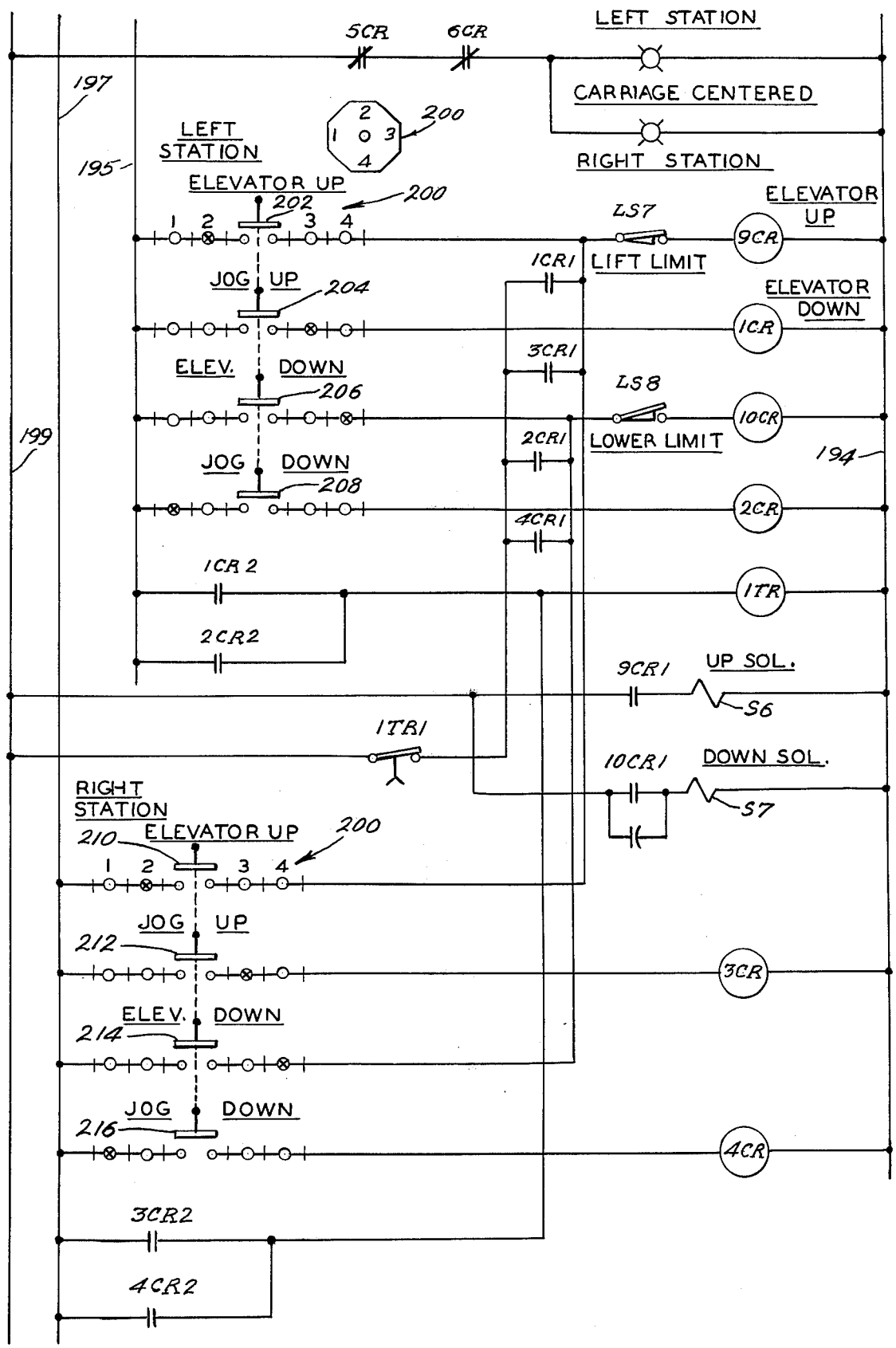
Figure 9C:
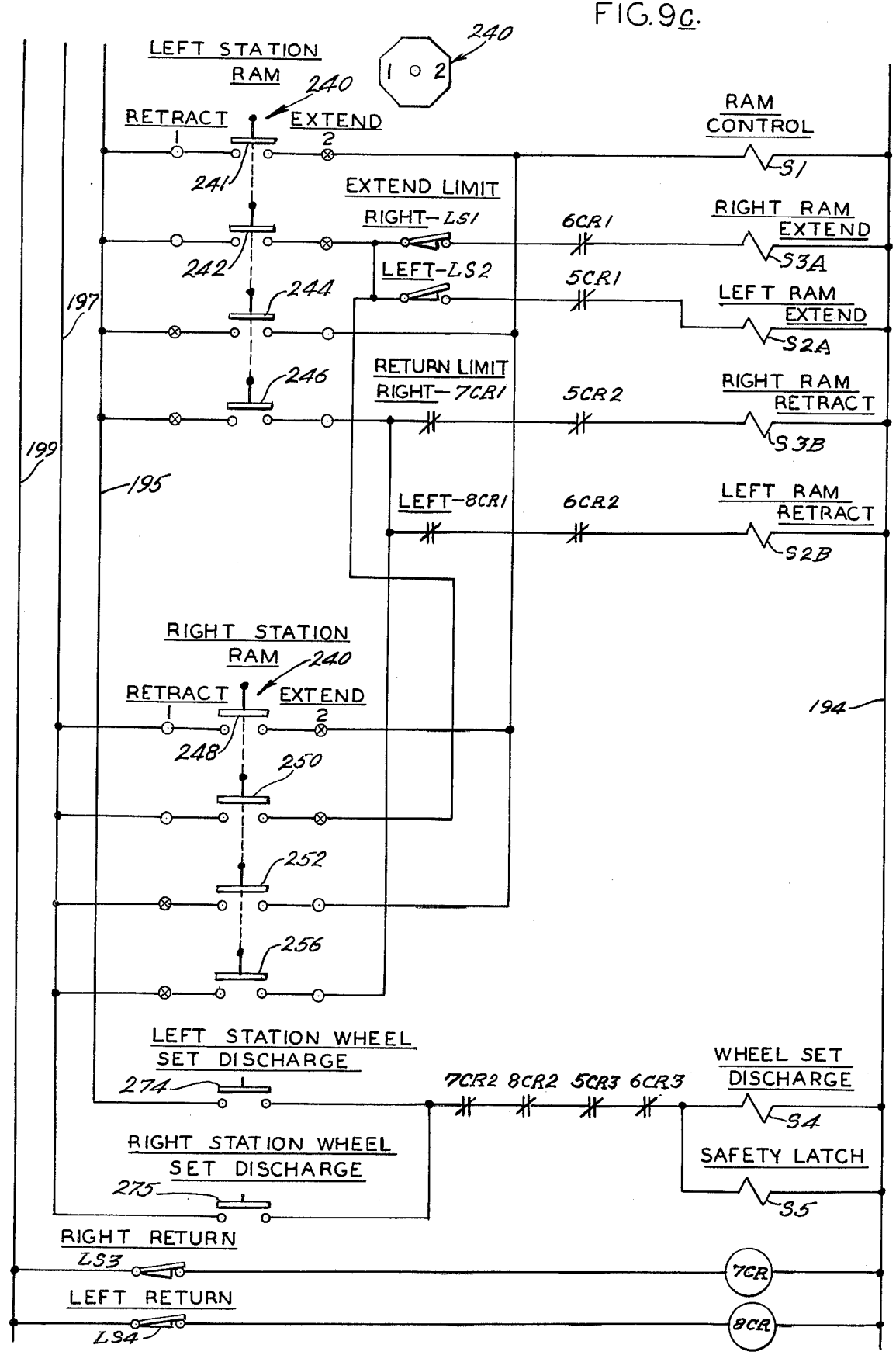

FIGS. 9a, 9b and 9c schematically show the control circuits of the bearing press. In FIG. 9a motor starter and main disconnect switch 170 is mounted on the hydraulic power unit (not shown). It provides power directly to the hydraulic pump motor 152 and transformer 182 which provides a step-down voltage to the control circuits.

The control circuits receive power from the secondary of transformer 182. The hydraulic pump relay IM is in series with the start switch 184, a stop switch 186, and left and right control panel emergency stop switches 188 across the transformer secondary. Momentary closure of the start switch 184 energizes the hydraulic pump relay IM which closes relay holding contacts 1M1 and closes contacts 1M2, 1M3, and 1M4 to start the hydraulic pump 152 motor. Momentary opening of stop switch 186 deenergizes relay 1M and opens it contacts to stop the hydraulic pump motor 152. This stops hydraulic power to the entire press. The emergency stop switches 188L and 188R on the control panels 48 function similarly under emergency conditions.

The various start and stop switches 184, 186, 188R and 188L are in series with the secondary of transformer 182 and therefore serve to energize and deenergize all of control circuits in the press. These control circuits separate generally into three parallel circuits for control respectively of the right side, left side, and overall control functions. These circuits have a common line 194 along the right of FIGS. 9a, 9b and 9c. Lines 195 and 197 are controlled by the left and right station active manual control selector switches 196 and 198 located at selector controls 48 which selectively may provide power to the respective ram control, elevator control and wheel set discharge control circuits. When selector switches 196 and 198 are closed in series to supply power to operate controls on one side of the press or the other, the controls on the sides which are active are indicated by indicator lights 196a and 198a.

The common parallel circuit provided through line 199 is connected to the centering limit switches 47 and 46 and to the return limit switches LS3 and LS4 (FIG. 9c), which indicate when a ram has returned to its normal retracted position. In addition line 199 provides power directly to the up and down solenoids S6 and S7 (FIG. 9b) and aids in operation of the right hand station elevator control circuits as will be described subsequently.

As shown in FIG. 9b, the elevator is controllable from either the right or left hand station by similar four-position joy sticks 200 on each control panel 48. The joy stick in a given one of four positions will allow the common actuator to actuate only the selected one of the switches and in this manner selectively regulates the elevator control circuit associated with each station. More specifically each joy stick 200 will allow the elevator to be continuously raised, continuously lowered, jogged-up or jogged-down. The left-hand elevator control circuits are in series with the left station active control switch 196 (FIG. 9a) and the right-hand elevator control circuits are in series with the right-hand station active control switch 198 (FIG. 9a).

To cause the elevator to be raised continuously, the joy stick 200 of the appropriate station control panel 48 must be moved to position 2, elevator up, effectively losing switch 202 or 210 which energizes relay 9CR and closes its normally open contracts 9CR1 to cause up solenoid S6 to be energized. Solenoid S6 operates a valve (not shown) regulating the hydraulic motor 62 which provides power for the elevator 28 to be raised. When the elevator has reached a preselected uppermost position as evidenced by the wheel tape read out counter, 65, the joy stick 200 is released, deenergizing relay 9CR and solenoid S6. Lift limit switch LS7 in series with relay 9CR, serves as an upper limit and when contacted, will open and deenergize relay 9CR to cause its associated contacts 9 CR1 to open and deenergize solenoid S6, thus stopping upward movement of the elevator 28.

To cause the elevator to be lowered continuously the joy stick 200 on the appropriate control panel 48 is positioned to the position 4, elevator down, effectively closing switch 206 or 214. Closing either switch 206 or switch 214 energizes relay 10CR and closes its normally open contacts 10CR1 to cause down solenoid S7 to be energized and cause the elevator to move downward. A lower limit switch LS8 is provided in series with relay 10CR to limit the downward movement of the elevator in a manner similar to the limitation to upward movement by limit switch LS7.

To cause the elevator to jog up, the joy stick 200 at the selected control panel 48 is moved to the position jog up 3. If the left-hand joy stick is so positioned, switch 204 in the left elevator control station circuit is activated causing relay 1CR to be energized and its associated contacts 1CR1 to be closed momentarily to energize relay 9CR and thereby momentarily energize up solenoid S6 to raise the elevator one step. If the right-hand joy stick is so positioned in position 3, switch 212 in the right elevator control station circuit is closed causing relay 3CR to be energized and its associated contacts 3CR1 to be closed which, in turn, momentarily energizes relay 9CR and energizes solenoid S6 to raise the elevator.

To cause the elevator to jog down, the joy stick 200 at the selected one of the control stations is positioned to position 1, jog down. If the left-hand joy stick is so positioned switch 208 in the left elevator control circuit will be closed, thus energizing relay 2CR and closing contacts 2CR1. This will momentarily energize relay 10CR and momentarily energize solenoid S7 to lower the selected elevator one step. If the right-hand joy stick is so positioned in position 1, switch 216 in the right elevator control circuit will be closed thus energizing relay 4CR and closing its contacts 4CR1. This will momentarily energize relay 10CR and momentarily close relay contacts 10CR1 to lower the selected elevator one step.

Timing for jogging the time length of the step is determined by relay 1TR which is started by closing contacts 1CR2, 2CR2, 3CR2 or 4CR2. When the relay 1TR times out a selected time, its opens its normally closed contacts 1TR1 which contacts are in series with parallel contacts 1CR1, 3CR1, 2CR1 and 4CR1 to interrupt relay 9CR or 10CR after the selected jogging period.

As shown in FIG. 9c the rams are controllable from either the right or left-hand station by a two-position ram control joy stick 240 on each control panel 48. Joy stick 240 controls the ram control circuits associated with each station and allows the rams to be extended or retracted. In a manner similar to that of the elevator control circuit, the ram control circuits are in series with the left and right-hand station control switches 196 and 198 and actuation of one of these switches will enable the respective ram control circuit to be enabled.

To extend both rams the joy stick 240 of either the right or left-hand control panel 48 must be positioned to position 2, extend. In position 2, switches 241 and 242 in the left station ram control circuit or switch 248 and 250 in the right station ram control circuit are closed. Switches 241 and 248 are in parallel so that closing either of them will energize solenoid S1 (seen also in FIG. 8), which, as previously described, is the on-off solenoid for providing hydraulic power to the rams. Switches 242 or 250 are also in parallel so that closing either of them will simultaneously energize the normally in parallel right ram extend solenoid S3A (see also FIG. 8) and left ram extend solenoid S2A (see also FIG. 8) which solenoids, as previously described, regulate the flow of hydraulic fluid to the rams so as to cause them to extend. If, while the rams are extending, one of the bearings offers more resistance than the other, then, as previously described, the wheel set will be driven off center and one of the centering limit switches 47 or 46, will be actuated. Closing switch 47 energizes relay 5CR and closing switch 46 energizes relay 6CR, causing their normally closed contacts 6CR1 or 5CR1 to open. Contacts 6CR1 are in series with right ram extend solenoid S3A and contacts 5CR1 are in series with left ram extend solenoid S2A, respectively. The opening of the relay contacts in series with its respective solenoid deenergizes that solenoid, thus stopping the ram activated by that solenoid. Also in series with solenoid S3A is the right ram extend limit swtich LS1 and in series with solenoid S2A is the left ram extend limit switch LS2 which are opened to deenergize their respective solenoids S3A and S2A when the rams reach their fully extended positions.

To retract the rams, the joy stick 240 of the right or left-hand control panel 48 is moved to the retract position 1. This actuates switches 244 and 246 in the left station ram control circuit or switches 252 and 256 in the right station ram control circuits. Switches 244 and 252 are in parallel with each other and switches 241 and 248 so that whichever one is closed will energize solenoid S1, the on-off solenoid controlling hydraulic operating fluid to the rams. Either one of parallel switches 246 and 256 simultaneously actuate the normally in parallel right ram retract solenoid S3B and left ram retract solenoid S2B, which regulate the flow of hydraulic fluid so as to cause the ram to be retracted.

If, while the rams are retracting the axle moves off center to the right, the right center limit switch 47 is actuated which energizes relay 5CR and opens its normally closed contacts 5CR2. Contacts 5CR2 are in series with the right ram retract solenoid S3B. This when the limit switch 47 is closed opening relay contacts 5CR2, solenoid S3B is deenergized and the right ram is stopped.

The wheel set discharge unit mechanism 68 is controlled from either the right or left hand control panel 48 by closing either of the parallel wheel set discharge control switches 274 or 275 to energize the in parallel wheel set discharge solenoid S4 and safety latch solenoid S5, provided none of the associated relays are energized to open normally closed contacts 7CR2, 8CR2, 5CR3, and 6CR3 which are also in series with solenoid S4 and S5. Solenoid S4 operates the wheel set discharge mechanism 68. The safety latch 75 is operated at the same time by solenoid 85.

When the right ram returns to its normal retracted position the right return limit switch LS3 is closed with energizes relay 7CR and opens its normally closed contacts 7CR1. Contacts 7CR1 are in a series with solenoid S3B so that opening the contacts deenergizes the solenoid and stops the right ram. Similarly, when the left ram returns to its normal retracted position, left return limit switch LS4 is closed which energizes relay 8CR opening its normally closed contacts 8CR1 in series with solenoids S2B to stop the left ram. Alternately, if while the rams are retracting, the axle moves off center to the left, the left center limit switch 46 is actuated which energizes relay 6CR and opens its normally closed contacts 6CR2. Contacts 6CR2 are in series with left ram retract solenoid S2B. Thus when the limit switch 46 is closed opening relay contacts 6CR2, the solenoid S2B is deenergized and the left ram is stopped.

A preferred embodiment of the invention has been described in some detail It will be understood by those skilled in the are that other embodiments within the scope of the present invention are possible. Modifications and variations of the structures shown and described within the scope of teh claims are intended to be within the scope and spirit of the present invention.

I claim:

1. A hydaulic press for simultaneously mounting bearing on bearing seats at opposite ends of an axle comprising:
   a supporting frame,
   opposing cylinders mounted on said frame,
   hydraulic rams in each cylinder movable toward the other to engage and position an axle between them, in a predetermined position, each ram having means for supporting the bearing concentric with the seat of said axle and further means relatively movable with respect to each said ram for driving the respective bearing from said supporting means onto their respective adjacent axle bearing seat,
   fluid sealing means between the cylinder and rams,
   fluid supply means for supplying fluid to each of said cylinders to drive said rams toward one another,
   means for sensing axial displacement of said axle from its center position as a result of one bearing requiring more force to be driven into place than the other, and
   means responsive to said sensing means for causing unequal pressure to be applied to said cylinders to drive said axle bearings onto said axle bearing seats and recenter said axle.

2. The hydraulic press of claim 1 in which the means causing unequal pressure to the cylinders employs means to selectively reduce flow to either of the cylinders.

3. The hydraulic press of claim 2 in which the means to selectively reduce flow includes valve means associated with each of the cylinders to modify flow to its associated cylinder.

4. The hydraulic press of claim 1 in which the relatively movable members of the rams are relatively slidable pieces, stop means are provided to limit relative movement and spring means is provided between said slidable pieces urging them apart and into said stop means such that hydraulic fluid will drive the ram pieces as a unit until an axle is engaged and then will urge further movement to drive bearings into place be movement of one sliding member relative to the other in opposition to said spring means.

5. The hydraulic press of claim 4 in which the spring means are compressions springs compressed between the relatively slidable ram members as the bearings are driven onto the seats.

6. The hydraulic press of claim 3 in which the means for sensing axial displacement of said axle from the center position employs at least a pair of each switch means actuable upon a predetermined displacement of said axle in a different axial direction so that actuation of one of the switches provides an indication of the direction of displacement.

7. The hydraulic press of claim 6 in which the switch means includes a pair of electrical limit switches positioned to be actuated by the axle or switch is movable with the axle one of which actuable for displacement in one axial direction and the other for displacement in the other direction.

8. The hydraulic press of claim 7 in which an electrical circuit is employed to operate one or the other of said valves in response to actuation of one or the other of said limit switches, each of which is associated with one of said valves, whereby actuation of one of said limit switches causes its respective valve means to modify flow to its associated cylinder.

9. The hydraulic press of claim 8 in which each valve means is arranged to cut off flow entirely to its associated cylinder.

10. The hydraulic press of claim 3 including elevator means engaged with said cylinders for vertically moving said cylinders to a position in which said bearings are coaxial with the seats of said axle.

11. The hydraulic press of claim 10 in which vertical sensing means for sensing vertical displacement of the cylinder.

12. The hydraulic means of claim 11 in which the sensing means include at least means is provided responsive to said vertical sensing means for causing said elevator means to stop movement at predetermined extreme upper or extreme lower vertical position.

13. The hydraulic press of claim 3 including means for sensing the axial displacement of the rams to a predetermined extreme extended or extreme retracted position, including means responsive to said mean for sensing the axial displacement of the rams, to cause said valve means to cut off said flow to both of said cylinders.

14. The hydraulic press of claim 4 in which the slidable piece engaging the axle has an abutment ring surrounding said slidable piece and driven by the other slidable piece, said abutment ring contacting and driving a bearing onto said bearing seat.

15. They hydraulic press of claim 1 in which the means for sensing displacement of said axle from the center position includes means respectively movable with the axle and fixed to the frame whereby displacement of said axle along its axis predetermined amounts from the center position will cause actuation of said sensing means.

16. The hydraulic press of claim 15 in which the sensing means includes a pair of switch elements one actuated upon movement of the axle a predetermined distance in one direction and the other actuated upon movement of a predetermined distance in the opposite direction.

17. The hydraulic press of claim 16 in which the switch elements are supported from the frame and are actuated by movement of structure movable with the axle.

18. The hydraulic press of claim 9 for use with wheel sets, in which wheel set dollies are employed to support the wheels while the axle is in the press and said wheel dollies are movable in the axial direction wherein the structure of the wheel dollies contacts the switches.

19. The hydraulic press of claim 1 having a wheel set with a pair of wheels and said axle, and a pair of wheel support dollies for supporting said wheels and positioning said axle between said opposing rams, in which the means for sensing displacement of said axle from the center position is a pair of limit switches one of which will be actuated by one of said wheel support dollies for each direction of axial displacement of the axle along its axis.

20. The hydraulic press of claim 1 in which the rams relatively movable members are relatively slidable and in which the supporting means consists of a slidable piece engaging said axle and providing a bearing supporting member coaxial with and adjacent to the axle bearing support surface.

21. The hydraulic press of claim 1 for an axle in a wheel set having a least a pair of wheels and wheel support dolly means for supporting said wheels, an unloading means onto which said wheel set is discharged from said dolly means, a wheel set discharge means having a ram positioned to push said wheel set from said support dolly means and means to actuate said ram.

22. The hydraulic press in claim 13 in which said wheel support dolly means consists of a pair of wheel support dollies, one to support each wheel, and in which the ram is actuated by a hydraulic cylinder, and in which said unloading means is a pair of rails positioned to receive the wheels of the wheel set is discharged from said dollies.

23. The hydraulic press in claim 1 for an axle in a wheel set having at least a pair of wheels on said axle, a pair of wheel support dollies for supporting said wheels, a set of loading rails from which said wheel set is loaded onto said support dollies, a set of unloading rails onto which said wheel set is unloaded from said dollies, a vertically oriented barrier plunger providing a safety latch means for preventing a wheel set which has entered the support dollies from said loading rails with excessive speed from continuing onto said unloading rails, said barrier plunger being retractable from the path of the wheel set to permit discharge of the wheel set from the dollies.

* * * * *